United States Patent Office.

JAMES QUINN, JR., OF GRAND RAPIDS, MICHIGAN.

COMPOUND FOR CALCIMINING AND FRESCOING WALLS, &c.

SPECIFICATION forming part of Letters Patent No. 299,262, dated May 27, 1884.

Application filed February 14, 1884. (No specimens.)

*To all whom it may concern:*

Be it known that I, JAMES QUINN, Jr., of Grand Rapids, in the county of Kent and State of Michigan, have invented a new and useful Improvement in Compounds for Calcimining and Frescoing Walls, Ceilings, &c., whether of wood, stone, brick, or plaster; and I do hereby declare that the following is a full, clear, and exact description of the same.

My invention is an improved dry-sized calcimine for coating and finishing the walls of rooms and other surfaces. The principal ingredients of this improved compound are sulphate of barium (or barytes) for a base and body, and calcined gypsum for its hardening and cleansing properties, equal parts of each; and in connection with this mixture I use powdered glue, gum-arabic, rock-salt, and alum. The glue and gum-arabic I use for their binding and adhesive properties; the rock-salt and alum for keeping the mixture in solution while being prepared or until it is applied to the wall or surface with a brush, and to increase the density and hardness of the surface. Any desired tint or color may be given to the surface by adding to the compound, while in the dry state, suitable pigments or anilines.

For my improved compound I use the above-mentioned ingredients, in proportions substantially as follows: sulphate of barium, twelve and one-half pounds; calcined gypsum, twelve and one-half pounds; pulverized glue, one and one-half pound; rock-salt, one-half pound; gum-arabic, one-half pound; alum, one-half pound. This compound I reduce to a uniform fineness, and it then can be placed in packages, ready for the market.

For use, hot water is added to the compound to reduce it to the consistency of paint. It is then applied with a brush, like paint, forming a smooth, hard, and durable surface.

I am aware that various compounds have been made for whitewashing, calcimining, &c., in some of which calcined gypsum, as a base, is employed; but I make an entire change of the base by using sulphate of barium, (barytes,) the working of which compound, when applied to the wall, is widely different. Compounds in which gypsum is used as a base, when mixed with water and allowed to stand a few hours, will settle and become hard and unfit for use.

My compound will remain in solution for any length of time, and can be used without any waste of material after being once prepared.

What I claim as my invention, and desire to secure by Letters Patent, is—

1. The herein-described compound to be used for finishing or coating walls, ceilings, &c., consisting of a mixture of sulphate of barium for a base and body, finely-pulverized calcined gypsum, pulverized glue, rock-salt, gum-arabic, and alum, in the proportions substantially as described.

2. In a coating for walls, the ingredients herein specified, or their equivalents, in combination with the sulphate of barium as a base or body, substantially as described.

In testimony whereof I affix my signature in presence of two witnesses.

JAMES QUINN, JR.

Witnesses:
O. E. BROWN,
JACOB SCHROUDER.